(12) United States Patent
Masias et al.

(10) Patent No.: US 9,780,420 B2
(45) Date of Patent: Oct. 3, 2017

(54) PERISTALTIC PUMP FOR TRACTION BATTERY THERMAL MANAGEMENT SYSTEM

(71) Applicant: Ford Global Technologies, LLC, Dearborn, MI (US)

(72) Inventors: Alvaro Masias, Ann Arbor, MI (US); Brian Joseph Robert, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/390,840

(22) Filed: Dec. 27, 2016

(65) Prior Publication Data

US 2017/0110772 A1    Apr. 20, 2017

Related U.S. Application Data

(62) Division of application No. 14/687,476, filed on Apr. 15, 2015, now Pat. No. 9,553,344.

(51) Int. Cl.
*H01M 10/50* (2006.01)
*H01M 10/63* (2014.01)
(Continued)

(52) U.S. Cl.
CPC ......... *H01M 10/63* (2015.04); *B60L 11/1864* (2013.01); *B60L 11/1874* (2013.01);
(Continued)

(58) Field of Classification Search
CPC ............. H01M 10/633; H01M 10/613; H01M 10/625; H01M 10/6554; H01M 10/486;
(Continued)

(56) References Cited

U.S. PATENT DOCUMENTS 3,595,699 A * 7/1971 Baude ............... H01M 8/04007
165/300
2005/0069424 A1 3/2005 Lu et al.
(Continued)

FOREIGN PATENT DOCUMENTS

JP  2013093929 A  5/2013
JP  2014110705 A  6/2014

*Primary Examiner* — Raymond Alejandro
(74) *Attorney, Agent, or Firm* — David B. Kelley; Brooks Kushman P.C.

(57) ABSTRACT

A battery assembly may include an array of battery cells, a conduit system, and an emitter. The conduit system delivers coolant for thermally communicating with the array and defines a channel with a flexible wall having dielectric particles. The emitter is located proximate the wall and programmed to selectively output a voltage or electric field to impart a dielectrically driven compression force on the particles to adjust a cross-sectional area of the channel to control a flow of the coolant therethrough. The channel may be a flexible resin-based tube including piezoelectric materials. The emitter may output a voltage to move the piezoelectric materials. The channel may be a flexible resin-based tube including materials having electrostriction properties. The emitter may output an electric field to move the materials having electrostriction properties.

7 Claims, 6 Drawing Sheets

(51) Int. Cl.
      *H01M 10/613*    (2014.01)
      *H01M 10/625*    (2014.01)
      *H01M 10/6556*   (2014.01)
      *H01M 10/6568*   (2014.01)
      *H01M 10/657*    (2014.01)
      *H01M 10/48*     (2006.01)
      *B60L 11/18*     (2006.01)
      *F04B 43/12*     (2006.01)
      *F04B 49/06*     (2006.01)

(52) U.S. Cl.
      CPC ............ *F04B 43/12* (2013.01); *F04B 49/065* (2013.01); *H01M 10/482* (2013.01); *H01M 10/486* (2013.01); *H01M 10/613* (2015.04); *H01M 10/625* (2015.04); *H01M 10/657* (2015.04); *H01M 10/6556* (2015.04); *H01M 10/6568* (2015.04); *B60L 11/1818* (2013.01); *B60L 2210/10* (2013.01); *B60L 2210/30* (2013.01); *B60L 2210/42* (2013.01); *B60Y 2200/91* (2013.01); *B60Y 2200/92* (2013.01); *B60Y 2400/112* (2013.01); *F04B 2205/09* (2013.01); *H01M 2220/20* (2013.01)

(58) Field of Classification Search
      CPC . H01M 2220/20; B60L 11/1874; F04B 43/12; Y10S 903/907
      See application file for complete search history.

(56) References Cited

U.S. PATENT DOCUMENTS

| | | | |
|---|---|---|---|
| 2011/0309552 A1 | 12/2011 | Amirouche et al. | |
| 2014/0045028 A1* | 2/2014 | Moon | H01M 10/5004 429/120 |
| 2014/0175867 A1 | 6/2014 | Sung et al. | |

* cited by examiner

PERISTALTIC PUMP FOR TRACTION BATTERY THERMAL MANAGEMENT SYSTEM

CROSS-REFERENCE TO RELATED APPLICATIONS

This application is a division of U.S. application Ser. No. 14/687,476 filed Apr. 15, 2015, now U.S. Pat. No. 9,553,344, the disclosure of which is hereby incorporated in its entirety by reference herein.

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A battery assembly includes an array of battery cells, a conduit system, and an emitter. The conduit system delivers coolant for thermally communicating with the array and defines a channel with a wall having dielectric particles. The emitter is located proximate the wall and configured to selectively output a voltage or electric field to impart a dielectrically driven compression force on the particles to adjust a cross-sectional area of the channel to control a flow of the coolant therethrough. The channel may be a flexible resin-based tube including piezoelectric materials. The emitter may output a voltage to move the piezoelectric materials. The channel may be a flexible resin-based tube including materials having electrostriction properties. The emitter may output an electric field to move the materials having electrostriction properties. The assembly may also include a sensor and a controller. The sensor may measure a flow rate of coolant flowing within the system. The controller may be in electrical communication with the sensor and the emitter. The controller may be configured to activate the emitter based on signals from the sensor indicating a flow condition outside of a predetermined flow rate range to manipulate a coolant flow rate of at least a portion of the system. The sensor may measure a temperature of the array. The controller may be configured to activate the emitter based on signals from the sensor indicating a temperature above a predetermined threshold to manipulate a coolant flow rate of at least a portion of the system. The emitter may be arranged with a bend in the channel to adjust a flow rate of coolant traveling therethrough. The controller may be configured to control the emitter based on conditions of the battery cells during a vehicle drive cycle or a vehicle cold start.

A vehicle includes a traction battery pack, a conduit system, an emitter and a control system. The conduit system provides a path for coolant to enter and exit the pack and includes a conduit. The sensor measures conditions of the pack and system. The emitter is arranged with the conduit to form a peristaltic pump. The control system is configured to activate the pump based on signals received from the sensor such that a cross-sectional area of a portion of the conduit is adjusted to influence a flow rate of the coolant flowing therethrough. The emitter may be an electromagnet to output a magnetic field. The emitter may be a voltage emitter or electric field emitter. The sensor may be configured to measure a flow rate of at least a portion of the system or a temperature of the traction battery pack. The controller may be further configured to selectively activate the emitter to output a magnetic field or an electric field to promote a flow of coolant within portions of the system adjacent to battery cells of the traction battery pack having a temperature exceeding a threshold value. The controller may be further configured to selectively activate the emitter to output a magnetic field or an electric field to promote a flow of coolant within portions of the system having a flow rate below a threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
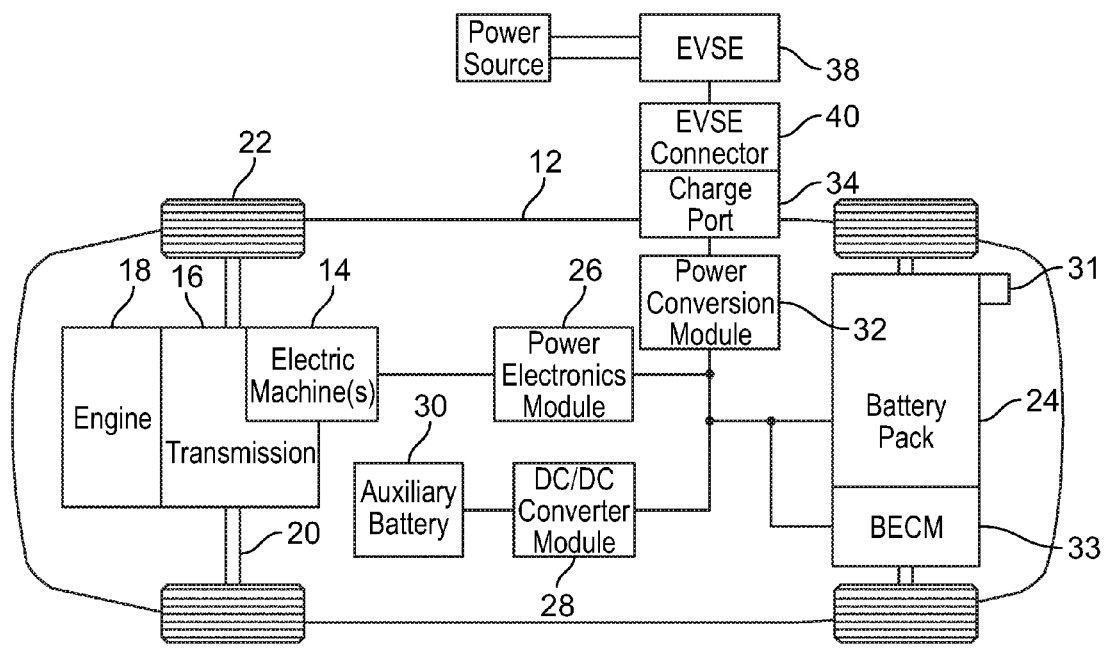
FIG. 1 is a schematic illustrating a battery electric vehicle.

FIG. 1 depicts a schematic of an example of a plug-in hybrid-electric vehicle (PHEV). A vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 may also act as generators and can provide fuel economy benefits by recovering energy that would normally be lost as heat in the friction braking system. The electric machines 14 may also provide reduced pollutant emissions since the vehicle 12 may be operated in electric mode or hybrid mode under certain conditions to reduce overall fuel consumption of the vehicle 12.

A traction battery or battery pack 24 stores and provides energy that can be used by the electric machines 14 or other vehicle 12 components. The traction battery 24 typically provides a high voltage DC output from one or more battery cell arrays, sometimes referred to as battery cell stacks, within the traction battery 24. The high voltage DC output may also be converted to a low voltage DC output for applications such as vehicle stop/start. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle or other hybrid vehicles. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural support components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92 is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
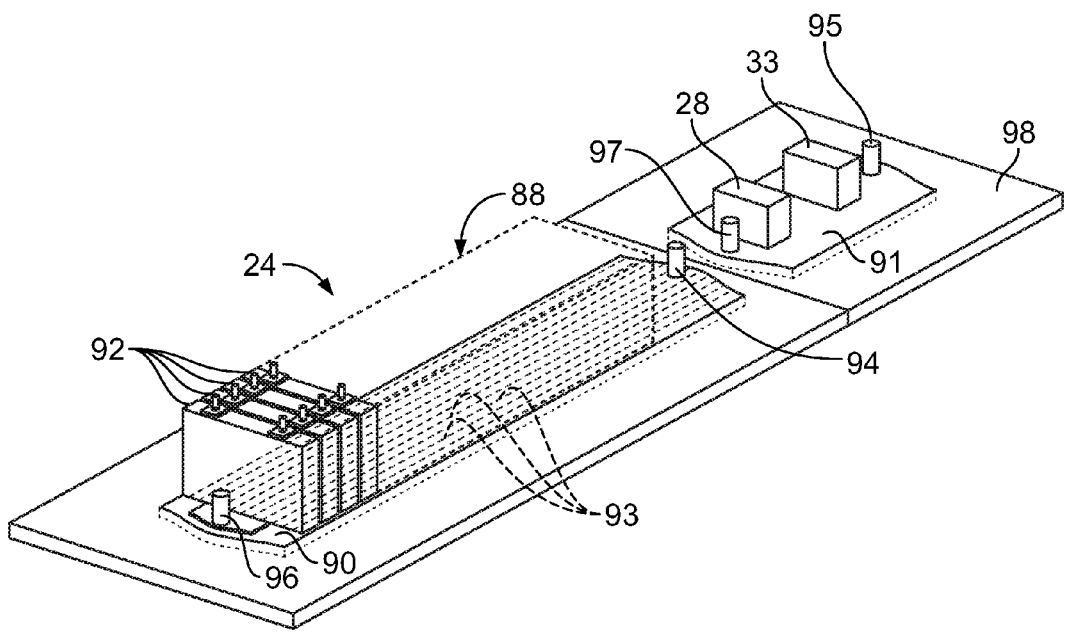
FIG. 2 is a perspective view of an example of a portion of a thermal management system for a traction battery.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

Operations of HV battery systems benefit from uniform temperature conditions of the battery cells within the HV battery system. Liquid cooled systems typically pump coolant through the system using a closed loop path with one pump. As the coolant flows through the system and draws heat from the battery cells, the coolant accumulates heat and a gradient of temperatures across the system may be created. Further, a coolant flow pattern may be disturbed due to various bends and/or irregular shapes of the coolant path within the system which may also contribute to temperature gradients. Battery cells of HV battery systems may age differently due to varying temperatures of the battery cells during operation of the electrified vehicle. These aging differences may result in performance degradation of the HV battery system and the electrified vehicle.

A peristaltic pump is an example of a positive displacement pump which may be used with an HV battery system to influence a flow of coolant within the system to assist in managing thermal conditions thereof and to combat performance degradation. For example, a peristaltic pump may be based on alternating a compression and a relaxation of a tube or hose to move fluids therein. In one example of a mechanically driven peristaltic pump, a roller may rotate and travel along a length of the tube or hose to compress portions along the length. In another example, a rotor with cams may be located at a bend of the tube or hose. As the rotor rotates, the portions of the tube or hose impacted by the cams are under compression and may be pinched closed. As the tube or hose returns to its natural state after the cam passes, the fluid is induced to move through the system. This process may be referred to as peristalsis.

Figure 3:
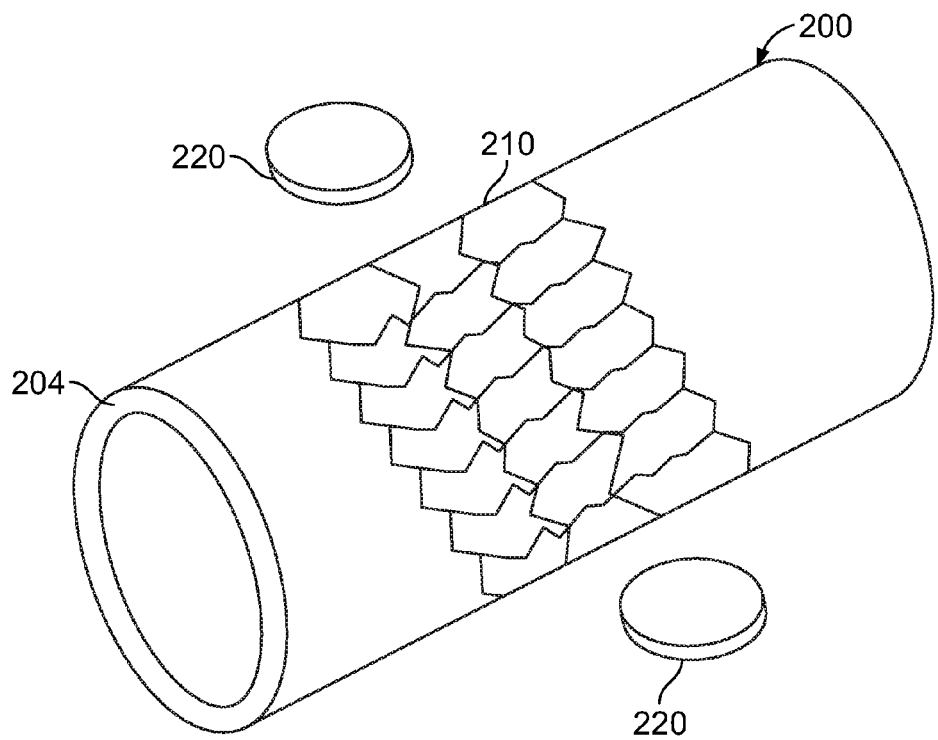
FIG. 3 is a perspective view of an example of a portion of a peristaltic pump assembly shown in a first configuration.
Figure 4:
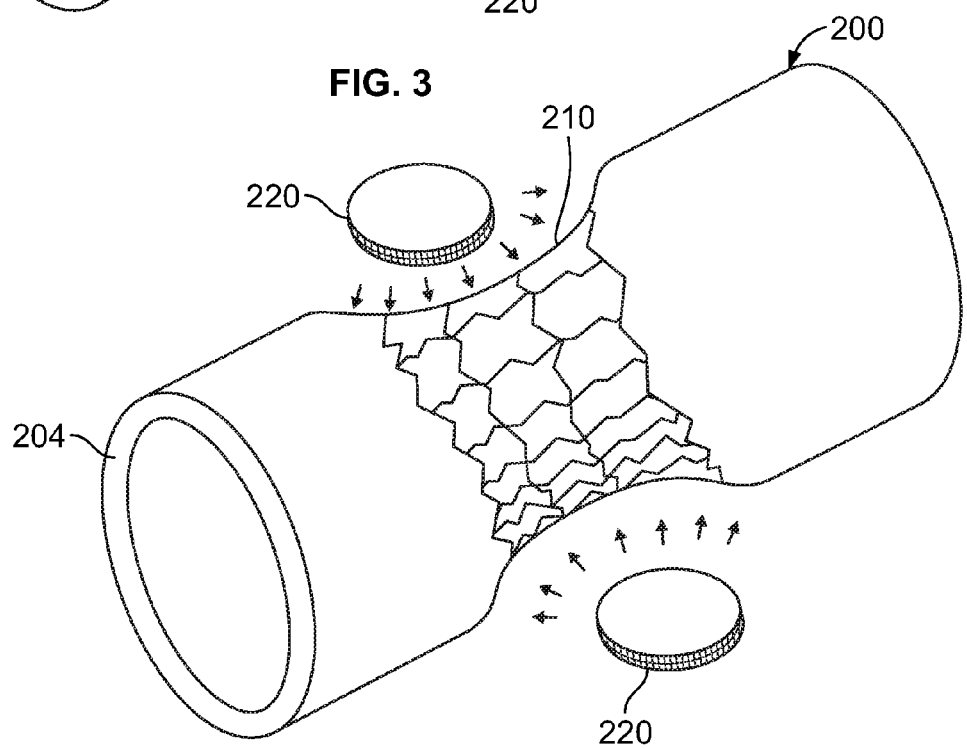
FIG. 4 is a perspective view of the portion of the peristaltic pump assembly of FIG. 3 shown in a second configuration.

FIGS. 3 and 4 show an example of a portion of a peristaltic pump assembly in which magnetic field outputs may be used to drive peristalsis of a coolant channel of a thermal management system for a HV battery system, referred to generally as a coolant channel 200 herein. The coolant channel 200 may have various forms and shapes, such as a tube shape. The coolant channel 200 is shown in a first configuration or natural state in FIG. 3 and a portion of the coolant channel 200 is shown in a second position or compression state in FIG. 4. The coolant channel 200 may be a component of a conduit system to deliver coolant for thermally communicating with a battery cell array and may define a flow path for coolant. Examples of coolant suitable for use with the peristaltic pump assembly include glycol, water, mineral oil, and synthetic oil. The coolant channel 200 may include particles susceptible to mechanical actuation, such as magnetic particles. The particles may be dispersed throughout, dispersed in selected portions of the coolant channel 200, or included in a component secured to the coolant channel 200.

For example, the coolant channel 200 may include a layer 204. The layer 204 may be a flexible layer which may comprise a flexible resin-based material, such as polypropylene. In this example, a mesh member 210 having magnetic particles may at least partially encompass or cover at least a portion of the coolant channel 200. Examples of materials having magnetic particles which may suitable for the mesh member 210 include magnetic steel and iron. The peristaltic pump assembly may include one or more electromagnets located near the coolant channel 200 to output a magnetic field. For example, a pair of electromagnets 220 may be located proximate the coolant channel 200 and such that magnetic fields output from the electromagnets 220 may influence the magnetic particles of the mesh member 210. The electromagnets 220 may be positioned on either side of the coolant channel 200 or in other configurations as suitable for particular packaging constraints. A controller (not shown) may be in electrical communication with the electromagnets 220 and may be configured to control operation thereof.

For example, in FIG. 3 the electromagnets 220 are shown deactivated and the coolant channel 200 is in a natural state. In FIG. 4 the electromagnets 220 are activated and emitting a magnetic field to impart a force (represented by arrows) on the magnetic particles in the mesh member 210. The magnetic fields from the electromagnets 220 influence the magnetic particles to move and compress the flexible layer 204 to adjust a cross-sectional area of the coolant flow path defined by the coolant channel 200. Flow rates of coolant traveling through the coolant channel 200 may thus be controlled with various sequences of activation and deactivation of the electromagnets 220.

The controller may also be configured to operate with one or more sensors. The peristaltic pump system may include a temperature sensor (not shown) and/or a flow rate sensor (not shown). The controller may be in electrical communication with the sensors to activate one or both of the electromagnets 220 based on signals from the sensors to appropriately adjust a flow rate of the coolant in response to, for example, a temperature of one or more battery cells or a coolant flow rate being outside of a predetermined threshold.

Incorporating this type of a peristaltic pumping motion in the coolant channel 200 may also provide additional control options relating to coolant flow. For example, a distributed system of coolant channels with moveable walls may influence coolant motion by locally and dynamically manipulating coolant flow at different locations with the conduit system. The moveable walls may be located at portions of the coolant flow path where geometry negatively impacts coolant flow, such as at bends or turns in the coolant channels.

FIGS. 5 through 8 show another example of a portion of a peristaltic pump assembly in which magnetic field outputs may be used to drive peristalsis of a coolant channel of a thermal management system for a HV battery system, referred to generally as a coolant channel 300 herein. In this example, the coolant channel 300 is shown disposed between a first set of electromagnets 320, a second set of electromagnets 324, and a third set of electromagnets 328. The coolant channel 300 may have various forms and shapes, such as a tube shape. The coolant channel 300 is shown in a first configuration or natural state in FIG. 5. Portions of the coolant channel 300 are shown in compressed states in FIGS. 6 through 8. The coolant channel 300 may be a component of a conduit system to deliver coolant for thermally communicating with a battery cell array and may define a flow path for coolant. Examples of coolant suitable for use with the peristaltic pump assembly include glycol, water, mineral oil, and synthetic oil. The coolant channel 300 may include magnetic particles dispersed throughout a layer 304, dispersed in selected portions of the coolant channel 300, or included in a component secured to the coolant channel 300. The layer 304 may be a flexible layer which may comprise a flexible resin-based material, such as polypropylene. The magnetic particles included with the layer 304 are represented by X's in FIGS. 5 through 8, however multiple configurations of magnetic particles are contemplated. Examples of materials having magnetic particles which may suitable for the layer 304 include magnetic steel and iron.

The sets of electromagnets may operate in a controlled sequence to impart a magnetic field at different portions of the coolant channel 300. A controller (not shown) may be in electrical communication with the sets of electromagnets and may be configured to control operation thereof. The controller may activate the sets of electromagnets in a sequence to facilitate a peristaltic pumping motion in which the cross-sectional area of the coolant channel 300 compresses and expands along a length or portion of the coolant channel 300.

Figure 5:
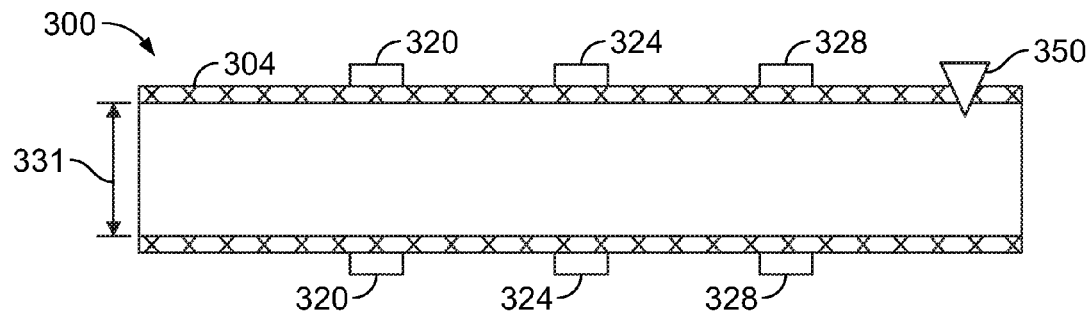
FIG. 5 is an illustrative plan view, in cross-section, of an example of a portion of a peristaltic pump assembly shown in a first configuration.
Figure 6:
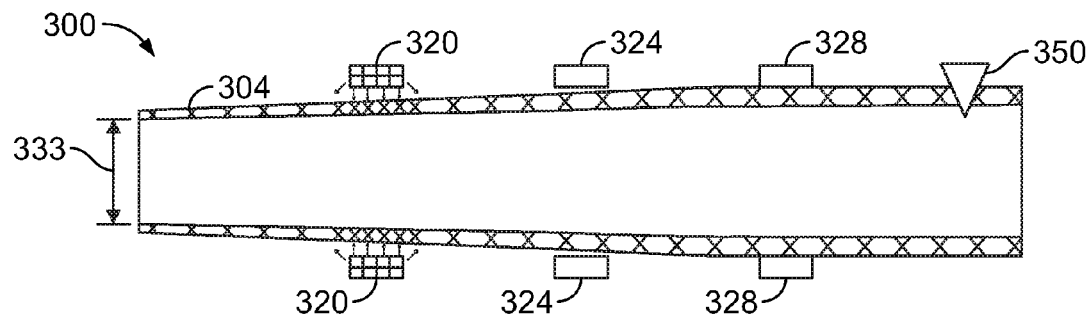
FIG. 6 is an illustrative plan view, in cross-section, of the portion the peristaltic pump assembly of FIG. 5 shown in a second configuration.

For example, in FIG. 5 the first set of electromagnets 320, the second set of electromagnets 324, and the third set of electromagnets 328 are shown deactivated and the coolant channel 300 is shown in the normal state. Dimension 331 represents a length across the coolant channel 300 in the natural state and may represent a diameter of the coolant channel 300 in a configuration in which the coolant channel 300 is cylindrically tube shaped. In FIG. 6, the first set of electromagnets 320 are shown activated and a portion of the coolant channel 300 proximate thereto is shown compressed as a result of the magnetic field imparting a force (represented by arrows) upon the magnetic particles subject to the magnetic field. Dimension 333 represents a length across the coolant channel 300 at a compressed portion thereof. The dimension 333 may represent a diameter of the coolant channel 300 in a configuration in which the coolant channel 300 is cylindrically tube shaped. The dimension 333 is less than the dimension 331. As such, the magnetic fields from the electromagnets 320 influence the magnetic particles to move and compress the flexible layer 304 to adjust a cross-sectional area of the coolant flow path defined by the coolant channel 300.

Figure 7:
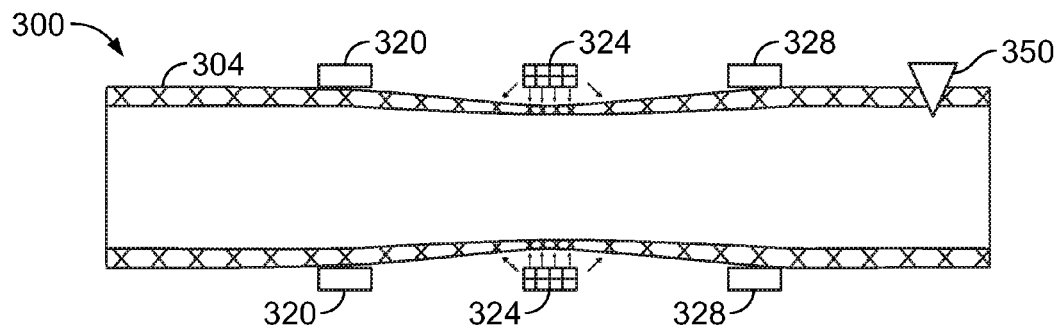
FIG. 7 is an illustrative plan view, in cross-section, of the portion the peristaltic pump assembly of FIG. 5 shown in a third configuration.
Figure 8:
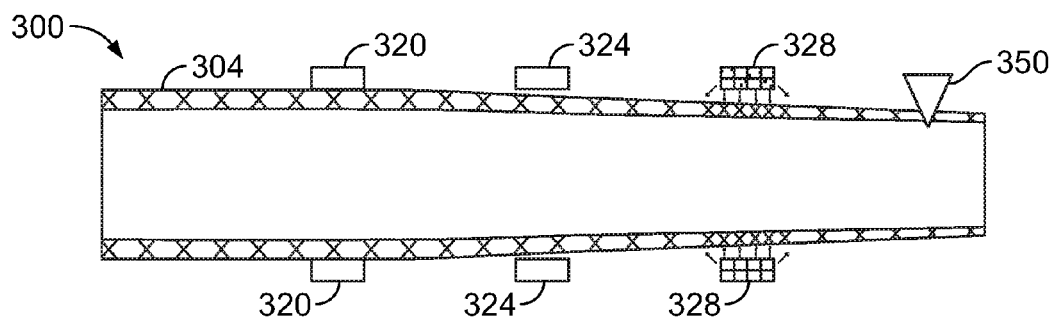
FIG. 8 is an illustrative plan view, in cross-section, of the portion the peristaltic pump assembly of FIG. 5 shown in a fourth configuration.

In FIG. 7, the second set of electromagnets 324 are shown activated and a portion of the coolant channel 300 proximate thereto is shown compressed as a result of the magnetic field imparting a force upon magnetic particles subject to the magnetic field. In FIG. 8, the third set of electromagnets 328 are shown activated and a portion of the coolant channel 300 proximate thereto is shown compressed as a result of the magnetic field imparting a force upon magnetic particles subject to the magnetic field. Subsequent activation of the sets of electromagnets compresses and then releases portions of the coolant channel 300 to promote peristalsis along the coolant channel 300. Flow rates of coolant traveling through the coolant channel 300 may thus be controlled with various sequences of activating and deactivating the sets of electromagnets.

The controller may also be configured to operate with one or more sensors. The peristaltic pump system may include a sensor 350. The sensor 350 may be a flow rate sensor. In another example, a temperature sensor (not shown) may be arranged with battery cells to monitor temperature conditions thereof. The controller may be in electrical communication with the sensor 350 to selectively activate the sets of electromagnets based on signals received therefrom. In response to receiving the signals, the controller may appropriately adjust a flow rate of the coolant within the coolant channel 300 by controlling operation of the sets of electromagnets.

Figure 9:
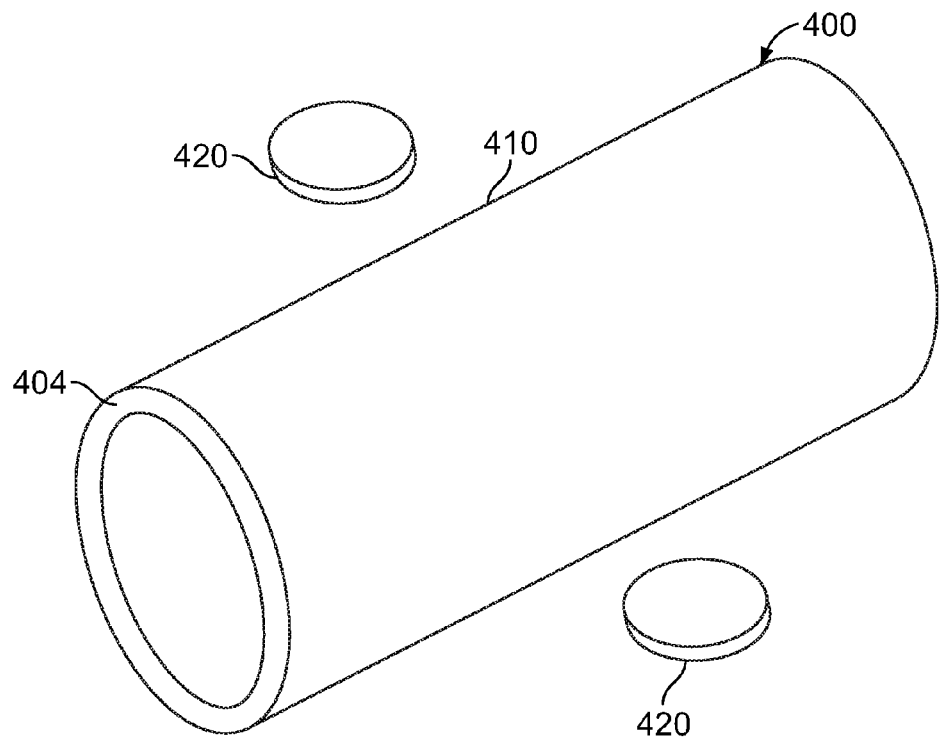
FIG. 9 is a perspective view of an example of a portion of a peristaltic pump assembly shown in a first configuration.
Figure 10:
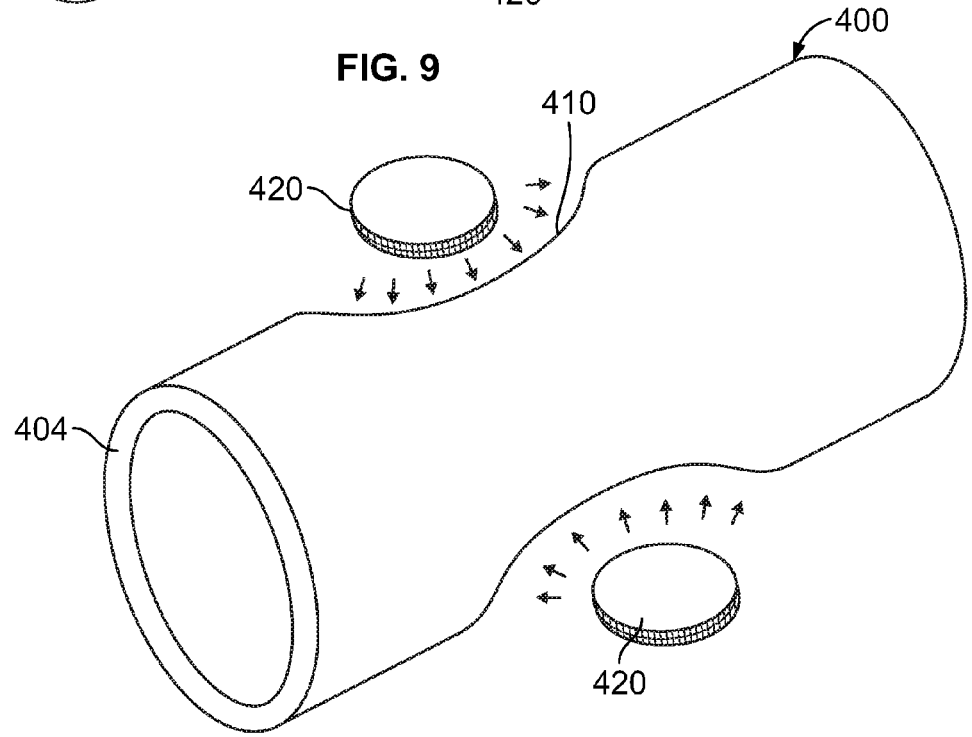
FIG. 10 is a perspective view of the portion of the peristaltic pump assembly of FIG. 9 shown in a second configuration.

FIGS. 9 and 10 show an example of a portion of a peristaltic pump assembly in which electrical field outputs may be used to drive peristalsis of a coolant channel, having electrostriction materials, of a thermal management system for a HV battery system, referred to generally as a coolant channel 400 herein. The coolant channel 400 may have various forms and shapes, such as a tube shape. The coolant channel 400 is shown in a first configuration or natural state in FIG. 9 and a portion of the coolant channel 400 is shown in a second position or compression state in FIG. 10. The coolant channel 400 may be a component of a conduit system to deliver coolant for thermally communicating with a battery cell array and may define a flow path for coolant. Examples of coolant suitable for use with the peristaltic pump assembly include glycol, water, mineral oil, and synthetic oil. The coolant channel 400 may include dielectric particles dispersed throughout, dispersed in selected portions of the coolant channel 400, or included in a component secured to the coolant channel 400. Examples of suitable electrostriction materials include lead magnesium niobate.

For example, the coolant channel 400 may include a layer 404. The layer 404 may be a flexible layer which may comprise a flexible resin-based material, such as polypropylene. The peristaltic pump assembly may include one or more emitters, such as an electric field emitter, located near the coolant channel 400 to output an electric field. For example, a pair of emitters 420 may be located proximate the coolant channel 400 and such that electric fields from the emitters 420 may influence the dielectric particles of the layer 404. The emitters 420 may be positioned on either side of the coolant channel 400 or in other configurations as suitable for particular packaging constraints. A controller (not shown) may be in electrical communication with the emitters 420 and may be configured to control operation thereof.

For example, in FIG. 9 the emitters 420 are shown deactivated and the coolant channel 400 is in a natural state. In FIG. 10 the emitters 420 are shown activated and thus emitting an electric field to impart a force (represented by arrows) on the electrostriction materials in the layer 404. The electric fields from the emitters 420 influence the electrostriction material to move and compress the flexible layer 404 to adjust a cross-sectional area of the coolant flow path defined by the coolant channel 400. Flow rates of coolant traveling through the coolant channel 400 may thus be controlled with various sequences of activating and deactivating the emitters 420.

The controller may also be configured to operate with one or more sensors. The peristaltic pump system may include a temperature sensor (not shown) and/or a flow rate sensor (not shown). The controller may be in electrical communication with the sensors to activate one or both of the emitters 420 based on signals from the sensors to appropriately adjust a flow rate of the coolant in response to, for example, a temperature of one or more battery cells or a coolant flow rate being outside of a predetermined threshold.

Incorporating this type of a peristaltic pumping motion in the coolant channel 400 may also provide additional control options relating to coolant flow. For example, a distributed system of coolant channels with moveable walls may influence coolant motion by locally and dynamically manipulating coolant flow at different locations with the conduit system. The moveable walls may be located at portions of the coolant flow path where geometry negatively impacts coolant flow, such as at bends or turns in the coolant channels.

FIGS. 11 through 14 show another example of a portion of a peristaltic pump assembly in which voltage outputs may be used to drive peristalsis of a coolant channel, having piezoelectric materials, of a thermal management system for a HV battery system, referred to generally as a coolant channel 500 herein. In this example, the coolant channel 500 is shown disposed between a first set of emitters 520, a second set of emitters 524, and a third set of emitters 528. The coolant channel 500 may have various forms and shapes, such as a tube shape. The coolant channel 500 is shown in a first configuration or natural state in FIG. 11. Portions of the coolant channel 500 are shown in compressed states in FIGS. 12 through 14. The coolant channel 500 may be a component of a conduit system to deliver coolant for thermally communicating with a battery cell array and may define a flow path for coolant. Examples of coolant suitable for use with the peristaltic pump assembly include glycol, water, mineral oil, and synthetic oil. The layer 504 may be a flexible layer which may comprise a flexible resin-based material, such as polypropylene. Examples of suitable piezoelectric materials for the coolant channel 500 include quartz, lead zirconate titanate, and barium titanate.

The sets of emitters may operate in a controlled sequence to impart a voltage at different portions of the coolant channel 500. A controller (not shown) may be in electrical communication with the sets of emitters and may be configured to control operation thereof. The controller may activate the sets of emitters in a sequence to facilitate a peristaltic pumping motion in which the cross-sectional area of the coolant channel 500 compresses and expands along a length or portion of the coolant channel 500.

Figure 11:
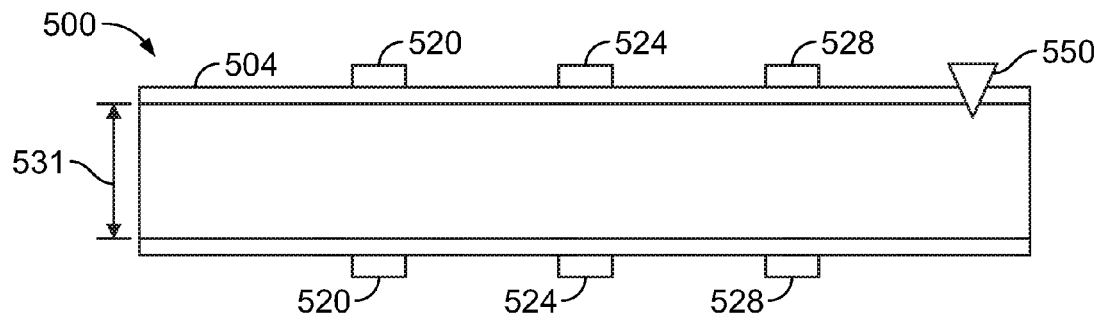
FIG. 11 is an illustrative plan view, in cross-section, of an example of a portion of a peristaltic pump assembly shown in a first configuration.
Figure 12:
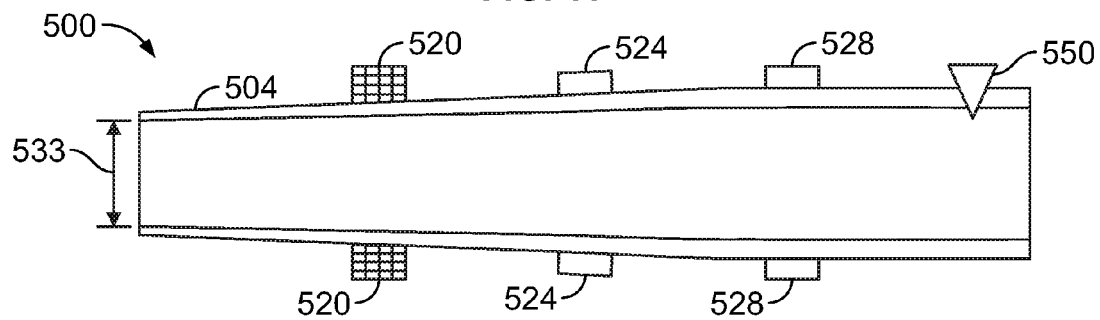
FIG. 12 is an illustrative plan view, in cross-section, of the portion of a peristaltic pump assembly of FIG. 11 shown in a second configuration.

For example, in FIG. 11 the first set of emitters 520, the second set of emitters 524, and the third set of emitters 528 are shown deactivated and the coolant channel 500 is shown in the normal state. Dimension 531 represents a length across the coolant channel 500 in the natural state and may represent a diameter of the coolant channel 500 in a configuration in which the coolant channel 500 is cylindrically tube shaped. In FIG. 12, the first set of emitters 520 are shown activated and a portion of the coolant channel 500 proximate thereto is shown compressed as a result of the voltage imparting a force (represented by arrows) upon the dielectric particles subject to the voltage. Dimension 533 represents a length across the coolant channel 500 at a compressed portion thereof. The dimension 533 may represent a diameter of the coolant channel 500 in a configuration in which the coolant channel 500 is cylindrically tube shaped. As such, the voltage from the emitters 520 influence the piezoelectric materials to move and compress the flexible layer 504 to adjust a cross-sectional area of the coolant flow path defined by the coolant channel 500.

Figure 13:
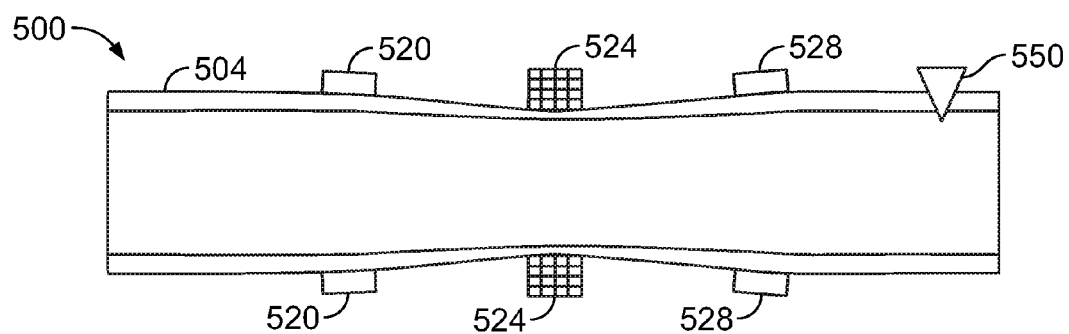
FIG. 13 is an illustrative plan view, in cross-section, of the portion of a peristaltic pump assembly of FIG. 11 shown in a third configuration.
Figure 14:
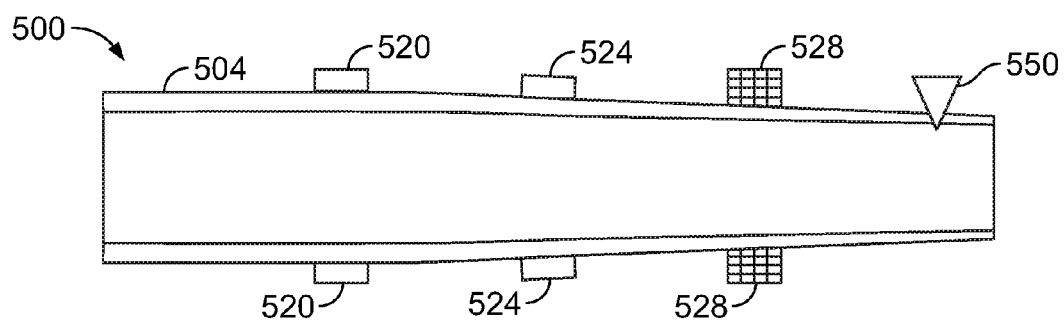
FIG. 14 is an illustrative plan view, in cross-section, of the portion of a peristaltic pump assembly of FIG. 11 shown in a fourth configuration.

In FIG. 13, the second set of emitters 524 are shown activated and a portion of the coolant channel 500 proximate thereto is shown compressed as a result of the voltage imparting a force upon piezoelectric materials subject to the voltage. In FIG. 14, the third set of emitters 528 are shown activated and a portion of the coolant channel 500 proximate thereto is shown compressed as a result of the voltage imparting a force upon piezoelectric materials subject to the voltage. Subsequent activation of the sets of emitters compresses and then releases portions of the coolant channel 500 to promote peristalsis along the coolant channel 500. Flow rates of coolant traveling through the coolant channel 500 may thus be controlled with various sequences of activating and deactivating the sets of emitters.

The controller may also be configured to operate with one or more sensors. The peristaltic pump system may include a sensor 550. The sensor 550 may be a flow rate sensor. In another example, a temperature sensor (not shown) may be arranged with battery cells to monitor temperature conditions thereof. The controller may be in electrical communication with the sensor 550 to selectively activate the sets of emitters based on signals received therefrom. In response to receiving the signals, the controller may appropriately adjust a flow rate of the coolant within the coolant channel 500 by controlling operation of the sets of emitters.

Figure 15:
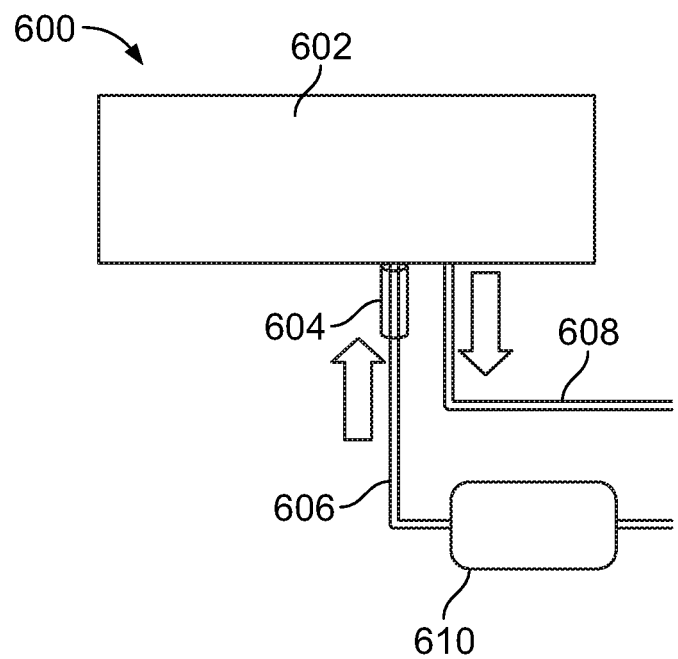
FIG. 15 is a schematic illustrating a portion a thermal management system of a traction battery pack including a peristaltic pump assembly.
Figure 16:
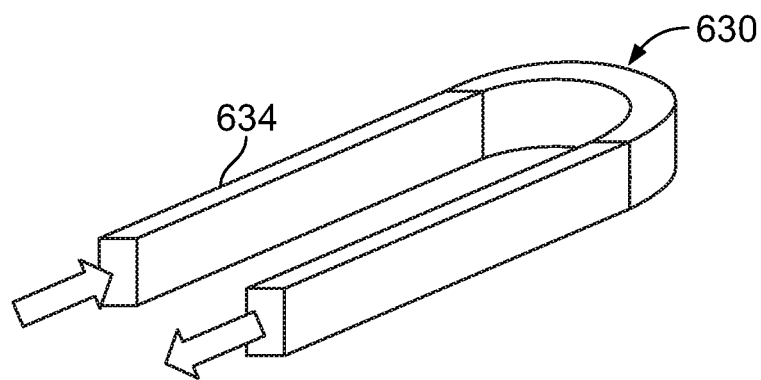
FIG. 16 is an illustrative perspective view of an example of a coolant channel for a thermal management system of a traction battery pack including a peristaltic pump assembly.

FIGS. 15 and 16 show examples of locations in which a peristaltic pump assembly may operate within a HV battery system. FIG. 15 shows an example of a portion of a HV battery system referred to generally as system 600 herein. The system 600 may include a battery pack 602, a peristaltic pump assembly 604, an inlet coolant channel 606, an outlet coolant channel 608, and a pump 610. The peristaltic pump assembly 604 may supplement operations of the pump 610 or may replace the use of the pump 610. For example, the peristaltic pump assembly 604 may be arranged with the inlet coolant channel 606 and adjacent the battery pack 602 to adjust a flow rate of coolant flowing to the outlet coolant channel 608. The peristaltic pump assembly 604 may, for example, increase a flow rate of coolant flowing through the battery pack 602 to assist in coolant battery cells of battery pack 602 which may be above a predetermined temperature threshold.

FIG. 16 shows an example of a peristaltic pump assembly which may operate with a HV battery system, referred to generally as a peristaltic pump assembly 630 herein. The peristaltic pump assembly 630 may be disposed within a thermal plate 634 and be arranged with a coolant channel 636. In this example, the peristaltic pump assembly 630 is located at a bend in the coolant channel 636. Bends in conduit systems may disrupt a flow rate of coolant. Operating the peristaltic pump assembly 630 at a bend may minimize or eliminate any flow rate disruptions due to the bend by adjusting a flow rate of the coolant flowing through the bend of the coolant channel 636. While the bend of the coolant channel 636 is shown as u-shaped in this example, it is contemplated that the peristaltic pump assembly 630 may be arranged with various types of bends, curves, or other such turns within conduit systems of HV battery systems.

The proposed systems and pump assemblies described above may also enhance battery pack thermal management during normal vehicle operations, drive cycles, and cold start operations by selectively activating the systems or pump assemblies based on measured conditions to compensate for temperature or flow fluctuations. The systems and assemblies described above may also enhance battery pack thermal management during charge operations to use power from a charging station for the system or pump assembly while the vehicle is off.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A battery assembly comprising:
   a battery cell array;
   a conduit system defining a coolant channel for coolant-array thermal communication with a flexible wall having dielectric particles; and
   more than one emitter each disposed along the flexible wall to selectively output a separate voltage or electric field to impart separate compression forces on the dielectric particles adjusting a channel cross-sectional area in sequence at different locations to control coolant flow therethrough with a peristaltic channel movement.

2. The assembly of claim 1, wherein the channel comprises a flexible resin-based tube including piezoelectric materials, and wherein the emitter outputs a voltage to move the piezoelectric materials.

3. The assembly of claim 1, wherein the channel comprises a flexible resin-based tube including materials having electrostriction properties, and wherein each of the more than one emitters outputs an electric field to move the materials having electrostriction properties.

4. The assembly of claim 1, further comprising:
   a sensor to measure a flow rate of coolant flowing within the conduit system; and
   a controller in electrical communication with the sensor and the emitter and programmed to activate the emitter based on signals from the sensor indicating a flow condition outside of a predetermined flow rate range to manipulate a coolant flow rate of at least a portion of the conduit system.

5. The assembly of claim 1, further comprising:
   a sensor to measure a temperature of the array; and
   a controller electrically connected to the sensor and the emitter and programmed to activate the emitter based on signals from the sensor indicating a temperature above a predetermined threshold to manipulate a coolant flow rate of at least a portion of the conduit system.

6. The assembly of claim 1, wherein one of the more than one emitters is arranged with a bend in the channel to adjust a flow rate of coolant traveling therethrough.

7. The assembly of claim 1, further comprising a controller electrically connected to the emitter and programmed to control the emitter based on conditions of the battery cells during a vehicle drive cycle or a vehicle cold start.

\* \* \* \* \*